United States Patent [19]
Uegaki

[11] Patent Number: 5,655,111
[45] Date of Patent: Aug. 5, 1997

[54] IN-CIRCUIT EMULATOR

[75] Inventor: Akihiro Uegaki, Hyogo, Japan

[73] Assignees: Mitsubishi Denki Kabushiki Kaisha, Tokyo; Mitsubishi Electric Semiconductor Software Co., Ltd., Hyogo, both of Japan

[21] Appl. No.: 499,607

[22] Filed: Jul. 7, 1995

[30] Foreign Application Priority Data

Feb. 9, 1995 [JP] Japan ................... 7-021581

[51] Int. Cl.⁶ .................................... G06F 9/455
[52] U.S. Cl. ................... 395/500; 364/DIG. 1; 364/232.3; 364/DIG. 2; 364/927.81
[58] Field of Search ................... 395/500, 575, 395/183.1, 183.05, 183.06, 183.04; 371/25, 20; 364/200 MS File, 232.3, 264.3, 900 MS File, 927.81, 578

[56] References Cited

U.S. PATENT DOCUMENTS

| | | | |
|---|---|---|---|
| 4,674,089 | 6/1987 | Poret et al. | 371/25 |
| 4,788,683 | 11/1988 | Hester et al. | 371/20 |
| 5,053,949 | 10/1991 | Allison et al. | 364/200 |
| 5,313,618 | 5/1994 | Pawloski | 395/500 |
| 5,321,828 | 6/1994 | Phillips et al. | 395/500 |
| 5,371,878 | 12/1994 | Coker | 395/500 |
| 5,375,228 | 12/1994 | Leary et al. | 395/575 |
| 5,477,475 | 12/1995 | Sample et al. | 364/578 |
| 5,488,688 | 1/1996 | Gonzales et al. | 395/183.1 |
| 5,497,456 | 3/1996 | Alexander et al. | 395/183.05 |
| 5,530,804 | 6/1996 | Edington et al. | 395/183.06 |
| 5,539,901 | 7/1996 | Ramirez | 395/500 |
| 5,581,695 | 12/1996 | Knoke et al. | 395/183.04 |

FOREIGN PATENT DOCUMENTS

| | | |
|---|---|---|
| 60-43754 | 3/1985 | Japan . |
| 63-56569 | 11/1988 | Japan . |

OTHER PUBLICATIONS

"Designing a VLSI Microprocessor for Emulation", R. Riven et al. IEEE, ASIC '90: 3rd Annual Seminar, 1990, pp. P5-8.1 -P5-8.4.

"The Boundary-Scan Master: Target Applications and Functional Requirements", by C. Yau et al., IEEE, 1990 International Test Conference Proceedings, pp. 311-315.

"An In-Circuit Signal Analyzer for Mixed Signal Digital Signal Processor", by S. Beling et al., IEEE, ICASSP '91: Acoustics, Speech & Signal Processing Conference, Jul. 1991, pp. 1109-1112.

"Monitoring Technique for RISC Embedded Systems", by K. Jundi et al., IEEE, National Aerospace and Electronics, 1993 Conference (NAECON), Aug. 1993, pp. 542-550.

"An In-Circuit Emulator for TMS320C25", by P. Ching et al., IEEE Transaction on Educatrion, vol. 37, No. 1, Feb. 1994, pp. 51-56.

"Using IEEE-1149.1 for In-Circuit Emulation", by Mike Winters, IEEE, WESCON/94: Idea/Microelectronics, 1994, pp. 525-528.

*Primary Examiner*—Kevin J. Teska
*Assistant Examiner*—Russell W. Frejd
*Attorney, Agent, or Firm*—Lowe, Price, LeBlanc & Becker

[57] ABSTRACT

An in-circuit emulator comprises a pod portion mounted with a microcomputer equivalent to a target microcomputer and an emulator main body which offers a debug function. There are provided between the pod portion and the emulator main body a common bus to be connected either to a bus of a controlling microcomputer in the emulator main body or to a bus of a microcomputer in the pod portion and a serial input-output line for realizing information exchange between the controlling microcomputer and the pod portion.

6 Claims, 3 Drawing Sheets

IN-CIRCUIT EMULATOR

BACKGROUND OF THE INVENTION

1. Field of the Invention

The present invention relates to an in-circuit emulator for debugging a program for a microcomputer to be mounted on a substrate. In the in-circuit emulator, a pod portion to be connected to the substrate and an emulator main body having a debugging function are housed in separate boxes and the pod portion and the emulator main body are connected through buses.

2. Description of the Prior Art

The in-circuit emulator is used for evaluating a function of a program for a microcomputer (a target microcomputer) to be mounted on a circuit substrate (target substrate) to be newly developed. As a representative in-circuit emulator, there is a system being composed of an emulator main body for evaluating a result of execution of a program, a pod portion mounted with an equivalent microcomputer to a target microcomputer, the pod portion which operates in place of the target microcomputer, and software for evaluation.

The pod portion is connected to the target substrate and the emulator main body. It standardizes signals which are different by the kinds of microcomputers to be evaluated and supplies the standardized signal to the emulator main body. One emulator main body can evaluate programs for many kinds of target microcomputers by using the pod portion as described in the above. The emulator main body is connected to the pod portion, a personal computer, an engineering work station, etc. The emulator main body has functions such as the detection of a breakpoint, a real time trace, the measurement of a program execution time, and measures the execution time of a real time trace or a program. The software for evaluation operates on a personal computer or an engineering work station and realizes the set control for various kinds of evaluation functions and the display control for evaluation results. The emulator main body executes the detection of a breakpoint and measures the execution time of a real time trace or a program, according to an instruction from a personal computer or an engineering work station operating under the software for evaluation. The results of the execution are transferred to the personal computer or the engineering work station.

FIG. 1 is a block diagram showing the configuration of a conventional in-circuit emulator. In FIG. 1, reference numeral 100 designates a pod portion mounted with an equivalent microcomputer to a target microcomputer; and 300, an emulator main body which evaluates a program execution result of a pod portion 100 based on a signal output from the pod portion 100.

In the pod portion 100, reference numeral 3 designates an emulation memory for storing a program being an evaluation object; 4, a microcomputer for executing a program stored in the emulation memory 3 with a reception of an execution instruction from the software for evaluation; 5, a dual-port RAM which is accessible from both microcomputer 4 and emulator main body 300; 6, a three-state buffer for making and breaking the connection between the emulation memory 3 and a bus 41 of the microcomputer 4; 7, a three-state buffer for making and breaking the connection between a bus 42, provided between the emulator main body 300 and the pod portion 100, and the emulation memory 3; which 8, a control circuit and when it receives an exclusive control signal from the emulator main body 300 telling that the emulator main body is going to access the emulation memory 3, it sets the three-state buffer 7 in a conductive state (not in a state of high impedance) and the three-state buffer 6 in a state of high impedance, and when it receives an execution instruction of a debug program from the emulator main body 300, it outputs the execution instruction to the microcomputer 4.

In the emulator main body 300, reference numeral 31 designates a controlling microcomputer which accesses the emulation memory 3 and outputs an execution instruction to the microcomputer 4; and 32, a debug circuit which executes the detection of a breakpoint, a real time trace, and the measurement of a program execution time, etc. Reference numeral 43 designates a control signal line for transmitting an exclusive control signal, an execution instruction, etc.

Next, the operation will be explained. The controlling microcomputer 31 of the emulator main body 300 downloads an object program for debugging into the emulation memory 3 of the pod portion 100 through the bus 42 and the three-state buffer 7. The object program for debugging is created on a personal computer or an engineering work station for example, and the program is transferred to the emulator main body 300 from the personal computer or the engineering work station. When the program is downloaded, the three-state buffer 7 is set in a conductive state and the three-state buffer 6 is set in a high impedance state.

When the object program for debugging is activated, the controlling microcomputer 31 of the emulator main body 300 outputs an execution instruction to a control circuit 8 in the pod portion 100. The control circuit 8 sets the microcomputer 4 in a executable state and it sets the three-state buffer 7 in a high impedance state and the three-state buffer 6 in a conductive state. The microcomputer 4 reads a program stored in the emulation memory 3 through the three-state buffer 6 and executes the program. The bus 41 of the microcomputer 4 is extended also to the emulator main body 300. Therefore, the debug circuit 32 is able to monitor the state of the bus 41. In a case where the setting of a breakpoint is made for example, the debug circuit 32 compares a state of the bus 41 with a break condition. In a case where the execution of a real time trace is set for example, the debug circuit 32 reads a signal on the bus 41 conforming to the trace condition and stores the taken-in signal.

When a break condition is realized, the debug circuit 32 informs the controlling microcomputer 31 about it. Then the controlling microcomputer 31 stops the execution of the microcomputer 4 through the control circuit 8 of the pod portion 100 and informs the personal computer or the engineering work station that the break condition is realized. The personal computer or the engineering work station is informed of the results of the real time trace in succession. When a user who grasps the program execution result through the personal computer or the engineering work station judges that the correction of the program is needed, he delivers a program correction instruction etc. to the emulator main body 300 through the personal computer or the engineering work station. Then the controlling microcomputer 31 of the emulator main body 300 outputs an exclusive control signal to the control circuit 8.

The control circuit 8 sets the three-state buffer 7 in a conductive state and sets the three-state buffer 6 in a high impedance state. Therefore, the controlling microcomputer 31 is made to be in an accessible state to the emulation memory 3 through a bus 42. In this state, the user inputs data for re-writing the program to the personal computer or the engineering work station. The controlling microcomputer 31 receives the data, and rewrites the contents of the program stored in the emulation memory 3 based on the data.

In the configuration as described in the above, since the emulator main body 300 takes in the other bus 42 than the bus for the microcomputer 4, controlling microcomputer 31 is able to approach various kinds of resources in the pod portion 100 during the operation of the microcomputer 4. In FIG. 1, a dual-port emulation memory 5 is shown as an example of such resources. However, when an evaluation object is a target microcomputer having a wide data bus or a wide address bus, the number of signal lines between the pod portion 100 and the emulation main body 300 is increased with the increase in the number of bits. Therefore, a problem occurs that the number of conductors of a cable to take in the busses, 41 and 42 is increased and flexibility of the cable is reduced.

Assuming that the microcomputer 4 and the controlling microcomputer 31 are both 16 bit microcomputers (address lines 24, data lines 16), a total number of signal lines amounts to 80.

Address lines: 24×2=48

Data lines: 16×2=32

In the case of an actual in-circuit emulator, there are other control signals than the data signals and the address signals even though the number of them is small.

In the case of an in-circuit emulator in which two busses 41 and 42 are provided between the pod portion 100 and the emulator main body 300, variety of resources in the pod portion 100 can be accessed during the operation of the microcomputer 4, but it has a problem within it that the number of signal lines between the pod portion 100 and the emulator main body 300 increases with the increase in the number of bits of the target microcomputer. The cost of parts such as connectors is increased and the countermeasure cost for EMI is also increased with the increase in the number of signal lines. Flexibility of a cable is reduced and the degree of freedom in the layout on a target substrate in the pod portion 100 is decreased.

SUMMARY OF THE INVENTION

The present invention is invented to improve an in-circuit emulator shown in FIG. 1, and an object of the invention is to offer an in-circuit emulator in which it is possible to decrease the number of signal lines in buses connecting between a pod portion and an emulator main body.

The in-circuit emulator according to the present invention comprises a common bus which can be connected either to a bus of a controlling microcomputer in the emulator main body or to a microcomputer in the pod portion, and a serial input-output line provided between the pod portion and the emulator main body to realize the information exchange between the controlling micro-computer and the pod portion, and the common bus is connected to the debug circuit in the emulator main body.

In the case of the in-circuit emulator, the number of signal lines between the pod portion and the emulator main body is largely decreased in comparing with the case of a conventional one, and even when the common bus is used by the microcomputer in the pod portion, the information exchange between the pod portion and the emulator main body can be realized.

DETAILED DESCRIPTION OF THE PREFERRED EMBODIMENTS

Figure 2:
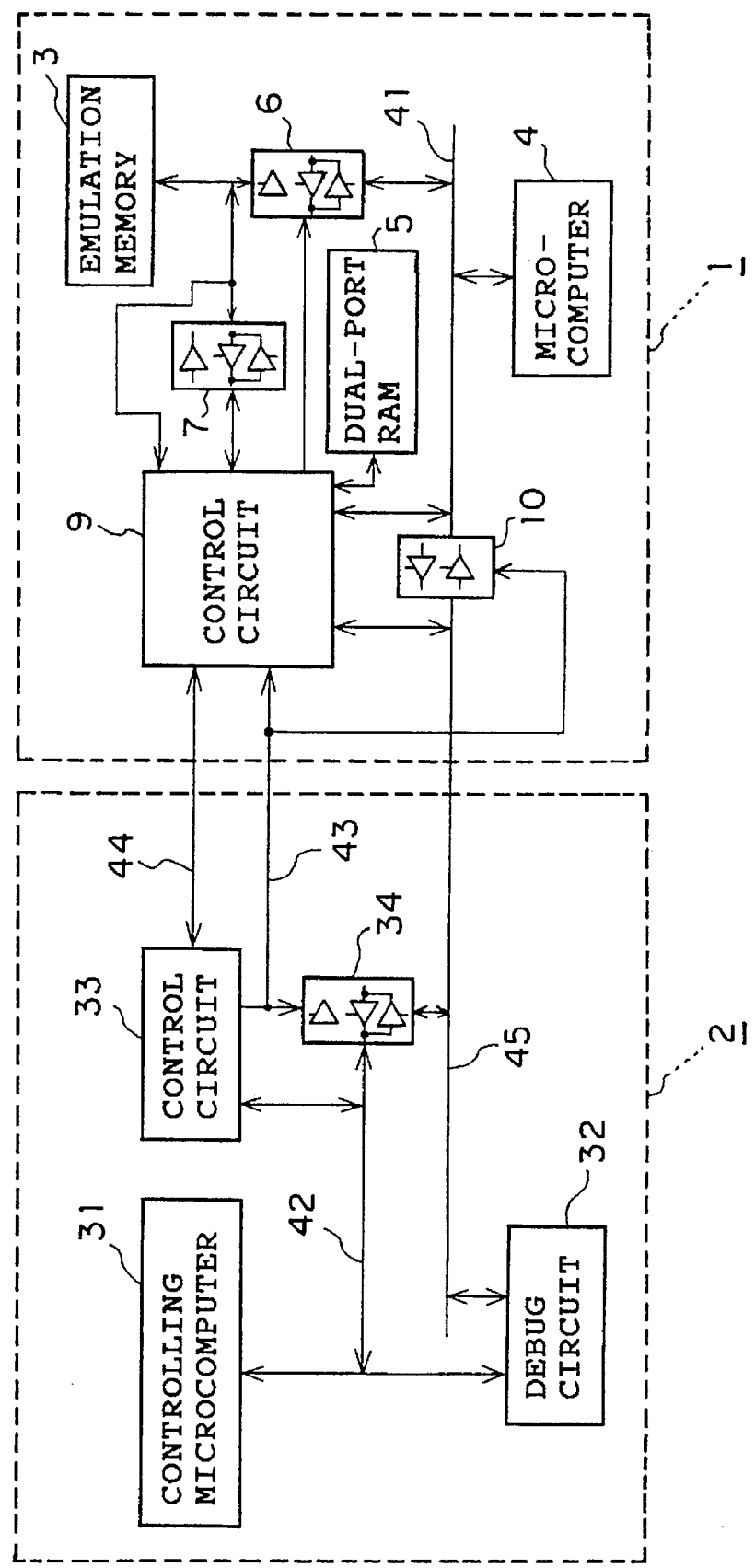
FIG. 2 is a block diagram showing the configuration of an in-circuit emulator in an embodiment according to the present invention.

FIG. 2 is a block diagram showing the configuration of an in-circuit emulator in an embodiment according to the present invention. In the figure, reference numeral 1 denotes a pod portion; and 2, an emulator main body. In the pod portion 1, a three-state buffer 10 is provided which makes and breaks the connection between a bus 41 and a common bus 45. A control circuit 9 in the pod portion 1 is connected to the bus 41 on the microcomputer 4 side and also to the common bus 45. The control circuit 9 makes three-state buffers 6 and 7 be in a conductive state selectively, and accesses an emulation memory 3 through the three-state buffer 7.

In the emulator main body 2, a control circuit 33, on receiving an exclusive signal from a controlling microcomputer 31 telling that it intends to access the emulation memory 3, sets a three-state buffer 34 in a conductive state and the three-state buffer 10 in the pod portion 1 in a high impedance state.

A signal line 43, a serial input-output line 44 and a common bus 45 are provided between the pod portion 1 and the emulator main body 2. The common bus 45 is connected to the debug circuit 32 in the emulator main body 2.

Figure 3:
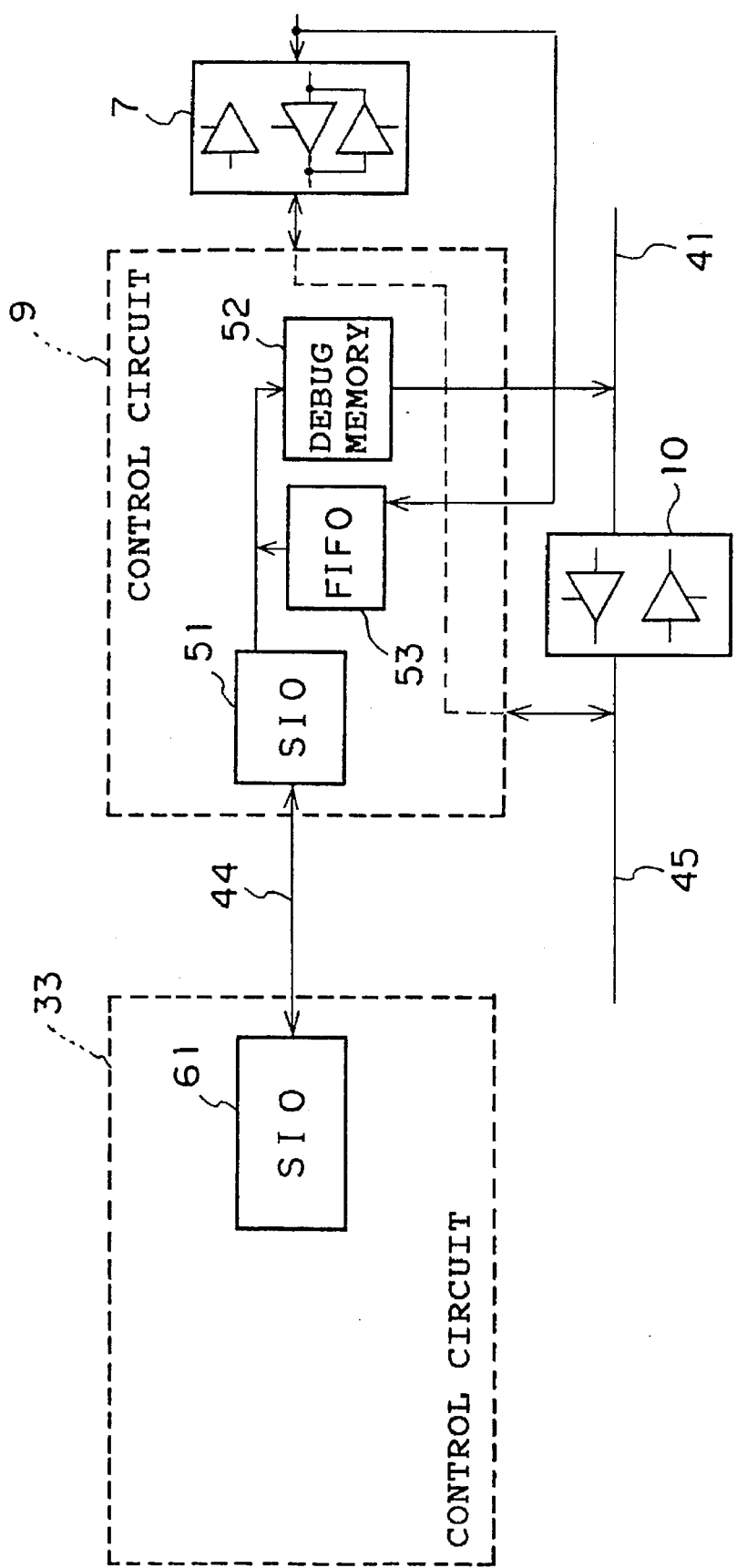
FIG. 3 is a block diagram showing the outline of the configuration of a control circuit of the emulator main body and a control circuit of the pod portion.

FIG. 3 is a block diagram showing the outline of the configuration of the control circuit 33 of the emulator main body 2 and the control circuit 9 in the pod portion 1. As shown in the figure, the control circuit 33 is connected to the serial input-output line 44 and comprises a serial input-output circuit 61 which performs serial-parallel data conversion. The control circuit 9 is connected to the serial input-output line 44 and comprises a serial input-output circuit which performs serial-parallel data conversion, a debug memory 52 which stores program codes for debugging, and a FIFO which stores the data input to or output from the emulation memory 3 temporarily.

Next, the operation will be explained. The controlling micro-computer 31 of the emulator main body 2 downloads an object program for debugging on the emulation memory 3 of the pod portion 1 through the bus 42, the common bus 45, the control circuit 9 and the three-state buffer 7. The object program for debugging is created on a personal computer or an engineering work station for example, and the program is transferred from the personal computer or the engineering work station to the emulator main body 2. When the program is downloaded, the three-state buffer 34 is set in a conductive state and the three-state buffer 10 is set in a high impedance state. The three-state buffer 7 is set in a conductive state and the three-state buffer 6 is set in a high impedance state.

When an object program for debugging is activated, the controlling microcomputer 31 in the emulator main body 2 outputs an execution instruction to the control circuit 33. Then, the control circuit 33 sets the three-state buffer 34 in a conductive state, and sets the three-state buffer 10 in a high impedance state. The control circuit 33 gives an execution instruction to the control circuit 9 on the pod portion 1 side through the bus 42 and the common bus 45. It is also possible to have a configuration in which the control circuit 33 in the emulator main body 2 transmits the execution instruction to the control circuit 9 in the pod portion 1 using a control signal line 43. The control circuit 9, on receiving the execution instruction, sets the three-state buffer 7 in a high impedance state and sets the three-state buffer 6 in a conductive state. Thereby, the micro-computer 4 is placed in a condition under which it is able to read a program stored in the emulation memory 3. The control circuit 9 makes the microcomputer 4 be in a executable state.

At the same time, the control circuit 9 outputs a completion signal, showing the completion of the output of an execution instruction for the microcomputer 4, to the control circuit 33 on the side of the emulator main body 2 through the common bus 45. The control circuit 33, on receiving the completion signal, sets the three-state buffer 34 in a high impedance state and sets the three-state buffer 10 in a conductive state in order to make the debug circuit 32 be able to read the execution process of the microcomputer 4.

The microcomputer 4 reads a program stored in the emulation memory 3 through the three-state buffer 6 and executes the program. The debug circuit 32 is able to monitor the condition of the bus 41 in succession through the common bus 45. For example, when a break point is set, the debug circuit 32 compares a state of the common bus 45 with the break condition. When the execution of a real time trace is set, the debug circuit 32 takes in a signal on the common bus 45 which conforms to the trace condition and stores the signal.

When the break condition is realized, the debug circuit 32 transmits a signal indicating the realization of the break to the controlling microcomputer 31. Then the controlling microcomputer 31 stops the operation of the microcomputer 4 through the control circuit 33 of the emulator main body 2 and the control circuit 9 of the pod 1 and transmits the fact that the break condition is realized to the personal computer or the engineering work station. The result of a real time trace is transmitted to the personal computer or the engineering work station in succession.

If a user who grasps the result of the program execution through the personal computer or the engineering work station judges that the correction of the program is needed, he transmits a program correction instruction, etc. to the emulator main body 2 through the engineering work station. Then, the controlling microcomputer 31 of the emulator main body 2 outputs an exclusive control signal to the control circuit 33. The control circuit 33 transfers the exclusive control signal to the control circuit 9 of the pod portion 1 through a control signal line 43. At the same time, the control circuit 33 sets the three-state buffer 34 in a conductive state and sets the three state buffer 10 in a high impedance state.

The control circuit 9 sets the three-state buffer 7 in a conductive state and sets the three-state buffer 6 in a high impedance state. Therefore, the controlling microcomputer 31 is made to be in a state where it is able to access the emulation memory 3 through the bus 42, the common bus 45, a control circuit 9, and the three-state buffer 7. In this state, the user inputs data for rewriting a program to the personal computer or the engineering work station. The controlling microcomputer 31 receives the data and rewrites the contents of the program stored in the emulation memory 3 based on the data. After the rewrite of the program, the controlling microcomputer 31 outputs an execution instruction of a microcomputer corresponding to the user's designation.

Figure 1:
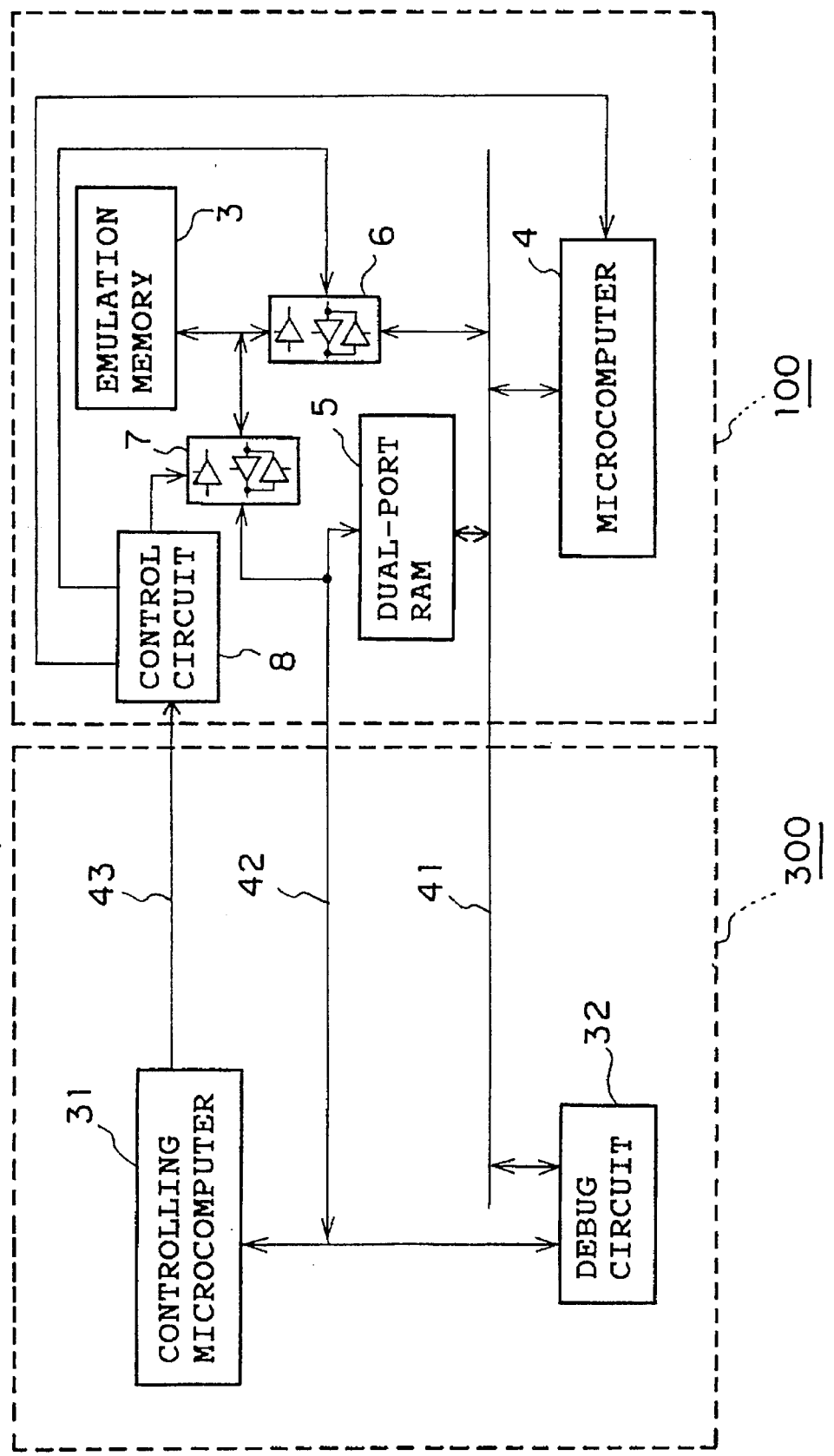
FIG. 1 is a block diagram showing the configuration of a conventional in-circuit emulator.

In the case of an in-circuit emulator shown in FIG. 1, since the emulator main body 300 introduces the other bus 42 together with the bus 41 of the microcomputer 4, the controlling microcomputer 31 is able to access various kinds of resources in the pod portion 100 during the operation of the microcomputer 4. However, in the case of an in-circuit emulator according to the present invention, only the common bus 45 exists between the emulator main body 2 and the pod portion 1. Therefore, a serial input-output line 44 is provided between the emulator main body 2 and the pod portion 1 to upgrade the efficiency of a debugging work.

In a case where the controlling microcomputer 31 desires to access various kinds of resources in the pod portion 1, when the microcomputer 4 is operating following the program in the memory 3, it notifies the control circuit 33 of the desire. Then, a serial input-output circuit 61 in the control circuit 33 outputs a command expressing the desire to a serial input-output line 44. A serial input-output circuit 51 in the control circuit 9 on the side of the pod portion 1 receives the command from the serial input-output line 44. The control circuit 9 makes an access to a resource corresponding to the command and the access result is output to the serial input-output circuit 51. The serial input-output circuit 51 outputs the access result to the input-output line 44. The controlling microcomputer 31 obtains the access result through the serial input-output circuit 61 of the control circuit 33.

When the microcomputer 4 is at a stop of the operation following a program in the memory 3, a debug memory 52 in the control circuit 9 is able to supply program codes for debugging in succession to the microcomputer 4. In a case where there is a resource which is incapable of being accessed from the exterior in the microcomputer 4, an internal memory for example, the resource can be referred to or changed only after the microcomputer 4 is started to operate. In such a case, program codes for accessing a resource can be supplied in succession to the microcomputer 4 from the debug memory 52.

The controlling microcomputer 31 of the emulator main body 2 is able to supply necessary program codes to the pod portion 1 through the serial input-output circuit 61 and the serial input-output line 44. In the pod portion 1, the serial input-output circuit 51 of the control circuit 9 receives the codes in succession and stores them in the debug memory 52. When the microcomputer 4 is at a stop of operation following the a program in the memory 3, program codes for debugging are output from the debug memory 52 to the microcomputer 4.

The microcomputer 4 operates following these program codes and outputs the operation results to the bus 41. The operation results output to the bus 41 are stored in FIFO 53 in the control circuit 9 in succession. The data in the FIFO 53 are output to the serial input-output line 44 by the serial input-output circuit 51. The controlling microcomputer 31 is able to obtain the operation results of the microcomputer 4 which is operated following the program codes for debugging through the control circuit 33 and the serial input-output line 44.

As explained in the above, an in-circuit emulator according to the present invention is able to realize an equivalent function to the in-circuit emulator shown in FIG. 1. Moreover, the number of signal lines for busses between the emulator main body 2 and the pod portion 1 can be saved to about a half. For example, when it is assumed that both target microcomputer and controlling microcomputer 31 are 16 bit microcomputers (address lines: 24, data lines: 16), total number of signal lines of the common bus 45 is 40.

In this case however, since the serial input-output line 44 is provided, 2 to 4 signal lines are needed for the serial input-output line 44. Still, 36 to 38 signal lines can be saved in comparison with the case of the emulator shown in FIG. 1.

In the above, the connection or changeover of the common bus 45 is realized by the three-state buffers, 6, 7, 10 and 34; however, it can be realized by other switching elements.

What is claimed is:

1. An in-circuit emulator comprising:

a pod portion having an emulation memory for storing an object program for debugging being connected to a target substrate to be loaded with a target microcomputer, and a microcomputer for executing a program stored in said emulation memory on receiving an execution instruction of the program;

an emulator main body having a controlling microcomputer for outputting an instruction for program debugging to said pod portion and a debug circuit for monitoring the execution process of said target microcomputer;

a common bus being provided between said pod portion and said emulator main body to be selectively connected either to a bus of said controlling microcomputer or to said microcomputer; and a serial input-output line for realizing information exchange between said controlling microcomputer and said pod portion being provided between said pod portion and said emulator main body;

said common bus being connected to the debug circuit of said emulator main body.

2. An in-circuit emulator according to claim 1 wherein:

said pod portion comprises a control circuit for controlling execution of said microcomputer; a first switch circuit for connecting-disconnecting the bus of said microcomputer and the emulation memory; a second switch circuit for connecting-disconnecting said control circuit and said memory; and a third switch circuit for connecting-disconnecting the bus of said microcomputer and said common bus;

said emulator main body comprises a control circuit being connected to said controlling microcomputer and said serial input-output line; and a fourth switch circuit for connecting-disconnecting said controlling microcomputer and said common bus.

3. An in-circuit emulator according to claim 2 wherein:

said control circuit of said emulator main body selectively sets either the third switch circuit or the fourth switch circuit in a conductive state; and said pod portion control circuit selectively sets either the first switch circuit or the second switch circuit in a conductive state according to an instruction from the control circuit of said emulator main body.

4. An in-circuit emulator according to claim 1 wherein:

said pod portion comprises a serial input-output circuit for receiving serial data from the serial input-output line and for sending out serial data to the serial input-output line; and said emulator main body comprises the serial input-output circuit for receiving serial date from the serial input-output line and for sending out serial data to the serial input-output line.

5. An in-circuit emulator according to claim 4 wherein said pod portion includes a debug memory for inputting program codes for debugging from said emulator main body through said serial input-output line and said serial input-output circuit and for supplying said program codes to said microcomputer while the microcomputer is at a stop of operation according to a program in the emulation memory.

6. An in-circuit emulator according to claim 5 wherein said pod portion includes a memory for storing temporarily the operation results of said microcomputer operated based on the program codes from the debug memory and for outputting the operation results to the serial input-output circuit.

* * * * *